US008433761B2

(12) United States Patent
Williams

(10) Patent No.: US 8,433,761 B2
(45) Date of Patent: Apr. 30, 2013

(54) METHOD FOR RECEIVING AND DISPLAYING SEGMENTS OF A MESSAGE BEFORE THE MESSAGE IS COMPLETE

(75) Inventor: Norman Williams, Bowie, MD (US)

(73) Assignee: Gallaudet University, Washington, DC (US)

( * ) Notice: Subject to any disclaimer, the term of this patent is extended or adjusted under 35 U.S.C. 154(b) by 0 days.

(21) Appl. No.: 12/040,684

(22) Filed: Feb. 29, 2008

(65) Prior Publication Data

US 2009/0222523 A1 Sep. 3, 2009

(51) Int. Cl.
*G06F 15/16* (2006.01)

(52) U.S. Cl.
USPC ........................................................ 709/206

(58) Field of Classification Search .................... 709/206
See application file for complete search history.

(56) References Cited

U.S. PATENT DOCUMENTS

| 6,898,411 | B2 * | 5/2005 | Ziv-el et al. | 434/350 |
|---|---|---|---|---|
| 7,590,696 | B1 * | 9/2009 | Odell et al. | 709/206 |
| 2003/0179230 | A1 * | 9/2003 | Seidman | 345/750 |
| 2005/0027839 | A1 * | 2/2005 | Day et al. | 709/223 |

OTHER PUBLICATIONS

Joseph Manna, "AIM 6.8 Beta is Now Available, Offers 'Real-Time IM'", Jan. 10, 2008, Peopleconnectionblog.com, http://www.peopleconnectionblog.com/2008/01/10/aim-6-8-beta-is-now-available-offers-real-time-im/.*
AIM for WyndTell/Reachnet Pagers, Norman Williams, Technology Access Program, Retrieved from <http://tap.gallaudet.edu/old/pulsar.htm>, 1997.
Talk, FreeBSD Man Pages, FreeBSD General Commands Manual, Retrieved from <http://www.freebsd.org/cgi?query=talk&manpath=FreeBSD+7.0-RELEASE>, Jul. 3, 2004.
Norman Williams, Futura-TTY software for IBM-PC v3.0 Readme File, Retrieved from ftp://cs.utk.edu/pub/shuford/terminal/future300.txt, Oct. 1993.
N. Williams & J. Harkins, TTY Basic (TTY Basics for Engineers/Product Designers), Technology Access Program, Gallaudet University, Retrieved from <http://tap.gallaudet.edu/Text/TTYBasics.asp>, Jun. 30, 1998.

* cited by examiner

*Primary Examiner* — Kenny Lin
*Assistant Examiner* — Farhad Ali
(74) *Attorney, Agent, or Firm* — K&L Gates LLP

(57) ABSTRACT

A method for messaging based communication includes enabling a first message to be entered into a message entry area of a first messaging application, receiving at least one segment of a second message from at least one remote messaging application before the message is completed, displaying the received segment of the at least one second message in an in process message display area of the first messaging application, receiving the second message completely from the at least one remote messaging application, and displaying the completed message in a designated completed message display area of the first messaging application.

20 Claims, 16 Drawing Sheets

METHOD FOR RECEIVING AND DISPLAYING SEGMENTS OF A MESSAGE BEFORE THE MESSAGE IS COMPLETE

BACKGROUND

Text messaging over a network is one popular method of communication. Current forms of text messaging do not provide the user with feedback regarding what others engaged in a text messaging session are typing or formulating a response in a text messaging conversation that is also integrated with an interleaved conversation.

SUMMARY

In one embodiment, a method for messaging based communication includes enabling a first message to be entered into a message entry area of a first messaging application, receiving at least one segment of a second message from at least one remote messaging application before the message is completed, displaying the received segment of the at least one second message in an in process message display area of the first messaging application, receiving the second message completely from the at least one remote messaging application, and displaying the completed message in a designated completed message display area of the first messaging application.

In one embodiment, the first messaging application is a text messaging application. In an alternative embodiment, the messages include files selected from the group comprising of: text, audio, video, or image files. In one embodiment, the method includes receiving a second segment of the second message. In another embodiment, the method further includes receiving a deletion or correction of at least one segment of the previously received segment of the second message. In one embodiment of the method, the messaging application enables the partial message display area to be disabled.

In one embodiment of the method, the at least one message segment and the at least one completed message are routed through a server. In another embodiment of the method, the at least one message segment and the at least one completed message are transmitted and received through a peer-to-peer connection. In an alternative embodiment of the method, if the at least one message segment is transmitted through a peer-to-peer connection, then the at least one completed message is routed through a server. Alternatively, in one embodiment, if the at least one completed message is transmitted though a peer-to-peer connection, then the at least one message segment is routed through a server.

In one embodiment, the method enables at least one segment of the first message to be transmitted to at least one remote messaging application as the first message is entered into the message entry area of the first messaging application. In another embodiment, the method also enables activation of a message complete signal in the first messaging application. In a further embodiment, after the message complete signal is activated, each message segment of the first message is enabled to be combined into a completed message. In one embodiment, the method further includes displaying the completed message in the completed message display area. In an alternative embodiment, after the message complete signal is activated, enabling the completed message to be removed from the message entry area after the completed message is displayed in the completed message display area. In one embodiment, the method may also include transmitting the message completed signal to the second messaging application after the message completed signal is activated. In an alternative embodiment of the method, the first messaging application transmits a message complete signal after transmitting a final segment of a message.

In one embodiment, the method includes enabling at least one segment of the first message to be transmitted to the at least one remote messaging application before the message is completed, receiving at least one segment of a first message from the first messaging application, displaying the received segment of the first message in an in process message display area of the at least one remote messaging application, receiving at least one completed message from the first messaging application, and displaying the completed message in a designated completed display area of the second messaging application.

In one embodiment of the method, transmitting the segment of the first message includes automatically transmitting the message while the message is being entered. In an alternative embodiment of the method, transmitting the segment of first message includes periodically transmitting a segment of the first message. In another alternative embodiment of the method, transmitting the segment of first message includes transmitting the segment of the message after a predetermined number keystrokes.

In another embodiment, a computer program product includes a computer usable medium having computer readable program code embodied therein configured to operate a messaging system. The computer program product including computer readable code configured to cause a computer to enable at least one message to be entered into a message entry area of a first messaging application, computer readable code configured to cause a computer to receive at least one segment of a second message from a second messaging application before the message is completed, computer readable code configured to cause a computer to display the received portion of the at least one second message in an in process message display area of the first messaging application, computer readable code configured to cause a computer to receive the second message completely from the second messaging application, computer readable code configured to cause a computer to display the completed message in a designated completed display area of the first messaging application.

Additional features and advantages are described herein, and will be apparent from, the following Detailed Description and the Figures.

DETAILED DESCRIPTION

Referring now to FIGS. 1-16, in various embodiments of the present invention, a messaging application system is provided. The messaging application system enables two or more people to connect and send messages to each other via messaging applications installed on computer terminals (e.g., PCs, laptops, handheld computers, mobile phones, VOIP, etc.). In one embodiment, the messaging application system enables at least one messaging application to send periodic updates to at least one other connected messaging application in the form of message segments of what the user is entering into their messaging application, before the user has completed entering their message; however, in another embodiment, each messaging application sends periodic updates to each of the other connected messaging applications. That is, as a user enters characters into their messaging application, the characters are sent to the other connected messaging applications. In one embodiment, the messaging application system also enables the messaging applications to receive and display the received message segments. Thus, at least one messaging application displays portions of a message as a connected user is entering the message into their messaging application, before the message has been completed. In one embodiment, at least one messaging application also displays completed messages in an interleaved conversation. After a user completes a message, at least one connected messaging application displays the completed message in a completed message display area. The messages in the completed message display area are displayed in the chronological order in which that messages were completed. That is, if one connected user asks a question, the question is displayed in the completed message display area. If another connected user answers the question immediately after the question is asked, the answer is displayed in the completed message display area below the question. Therefore, the completed messages are interleaved into a conversation as the conversation occurs.

Figure 1:
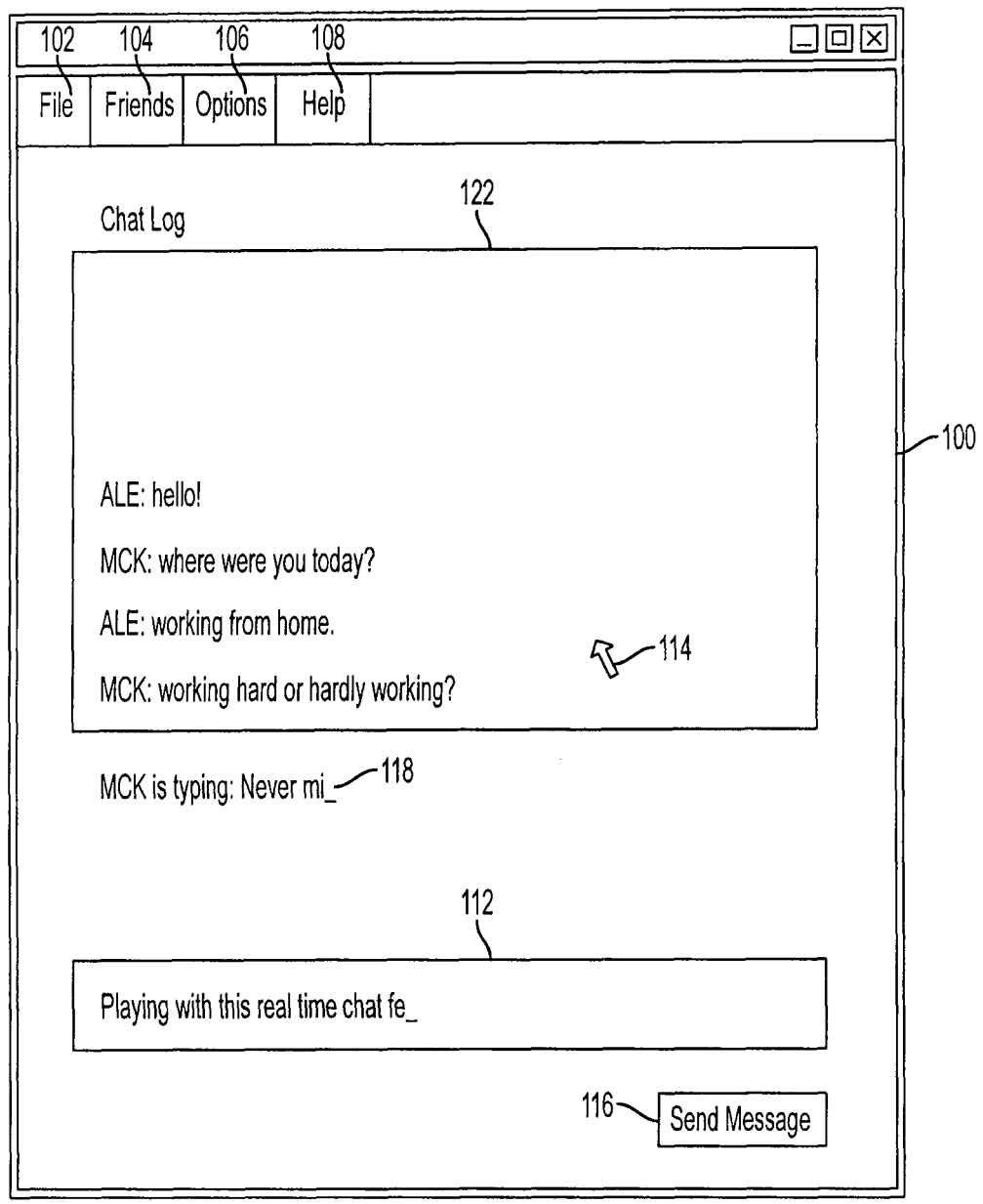
FIG. 1 is an illustration of a messaging application displaying received segments of a message before a message is completed in accordance with one embodiment.

Referring to FIG. 1, in one embodiment, a messaging application is illustrated that participates in a chat or instant messaging session. The messaging application can receive and display at least one segment of a message from another messaging application that is not complete. In one embodiment, the messaging application connects to at least one other messaging application; however, the messaging application can connect to any suitable number of additional messaging applications. In one embodiment, the messaging application transmits and receives messages from any connected messaging application. In one embodiment, the messaging application transmits and receives message segments of uncompleted messages. The messaging application also transmits and receives completed messages.

As shown in FIG. 1, the messaging application system includes a messaging application 100. In one embodiment, messaging application 100 includes message status indicator 118 that displays information about what tasks a remote user is performing on an uncompleted message. In one embodiment, message status indicator 118 also displays at least one segment of a message that has not yet been completed (e.g., an in process message). In another embodiment, messaging application 100 further includes chat log 122 that displays a record of a conversation based on completed messages or completed messages and in process messages.

In one embodiment, the messaging application 100 also includes a plurality of application menu buttons 102, 104, 106, and 108; however messaging application 100 can include any suitable number of menu buttons depending on the feature requirements of messaging application 100. The application menu buttons 102, 104, 106, and 108 enable a user to control various aspects of messaging application 100. Messaging application 100 also includes a plurality of message information displays. Message entry area 112 displays the message that the user of messaging application 100 is entering. In one embodiment, messaging application 100 includes pointer 114 that enables a user to select or activate various commands and features displayed in messaging application 100. In one embodiment, messaging application 100 includes a send message button 116 that enables a user to tell messaging application 100 that an entered message is complete and ready to transmit to any connected messaging application; however, messaging application 100 can use any other suitable message completed notification mechanism.

In one embodiment, messaging application 100 includes file menu button 102. In one embodiment, file menu button 102 includes a plurality of messaging application commands, such as commands to close messaging application 100. File menu button 102 also includes commands to open previously saved records of conversations or save records of current conversations. In one embodiment, messaging application 100 includes friends menu button 104. Friends menu button 104 includes messaging application commands such as commands to connect to at least one other remote messaging application user (hereinafter, "friend" or "connected friend"), add new friends, and commands to manage saved friends. In one embodiment, the messaging application 100 includes options menu button 106. Options menu button 106 includes messaging application configuration options such as modifying application screen colors and themes. Options menu button 106 can also include network connectivity and configuration options such as storing a user's unique identifier. In one embodiment, messaging application 100 includes help menu button 108. Help menu button 108 includes commands to activate the messaging application 100 instruction manual and other messaging application 100 assistance features. While the various menu buttons and associated commands described above appear in one embodiment of the messaging application, in an alternative embodiment, each menu button includes any suitable number of commands associated with functions of the menu button. Furthermore, messaging application 100 can also include any suitable number of menu buttons necessary to provide a user with adequate control over messaging application 100.

In one embodiment, messaging application 100 includes a messaging name identifier. Messaging name identifier identifies to other potential connected friends the person who is using messaging application 100. In one embodiment, when a user activates messaging application 100, the user provides messaging application 100 with a unique identifier. In one embodiment, the user provides messaging application 100 with a unique identifier by entering the unique identifier into a text entry area, such as through a command found in options menu button 106. Alternatively, in one embodiment, messaging application 100 has the user's unique identifier saved from a previous chat session. In this embodiment, once the user starts messaging application 100, the user may select the previously saved unique identifier. Alternatively, the saved unique identifier is automatically selected when the user activates messaging application 100. In another alternative embodiment, messaging application 100 is shared by multiple different users. Alternatively, a single user maintains multiple different unique identifiers (e.g., the user maintains a unique work identifier used for chat sessions with work people and a unique home identifier used for chat sessions with friends outside of work). In either case, messaging application 100 can include a plurality of different saved unique identifiers to choose from. Thus, a user can select from a list of previously saved unique identifiers that identify the user to other potential connected friends. Once a user has selected a unique identifier in messaging application 100, messaging application 100 can display the unique identifier in a messaging identifier area. However, it should be appreciated, that in one embodiment, messaging application 100 does not display any unique identifier or a messaging identifier area.

In one embodiment, after the unique identifier is selected, messaging application 100 can log into a messaging application server. The messaging application server tracks events occurring at messaging application 100 and records how friends can reach messaging application 100. Thus, when friends log into the messaging application server, the messaging application server can provide the user's status (e.g., available, offline, busy) to the friends. Once messaging application 100 is connected to the messaging application server, the messaging application servers records that messaging application 100 (e.g., the user associated with the unique identifier) is available for a chat messaging session. In one embodiment, when messaging application 100 logs into the messaging application server, messaging application 100 can also query the messaging application server on whether at least one other predefined user (e.g., friends, which are identified by their own unique identifiers) are available for a chat messaging session. In one embodiment, if the messaging application server identifies any friends that are available for a chat messaging session, messaging application 100 lists these available friends in an available friends area, such as found under the friends menu button; however, available friends can be displayed in any other suitable manner, such as through a separate application window.

In one embodiment, all messages transmitted to friends are transmitted through the messaging application server. In one alternative embodiment, messaging application 100 does not log into a messaging application server. In this embodiment, messaging application 100 enables a user to provide network address information regarding how to locate or contact at least one friend. Once messaging application 100 receives network address or contact information for the at least one friend, messaging application 100 can directly query the friend for chat session availability without the need for a chat messaging server.

In an alternative embodiment, messaging application 100 logs into a messaging application server to obtain network address information or contact information for at least one friend. Once the messaging application server provides the necessary contact information for the at least one friend, messaging application 100 directly contacts the at least one friend (e.g., through a peer-to-peer connection) for status information, to transmit invitations to join a chat session, or to send messages.

In one alternative embodiment, the user logs into messaging application 100 anonymously. An anonymous login prevents at least one friend, or other potential chat participants from discovering the identity of the anonymous user or know that the anonymous user is available to participate in a chat session. For example, medical professionals may provide assistance though chat messaging sessions (e.g., provide guidance for substance abuse problems or general health and well being). A user may wish to seek such assistance without their identity being revealed. An anonymous login enables a user to participate in a sensitive chat session without fear of their identity being discovered.

FIG. 1 illustrates message entry area 112 included in messaging application 100. In one embodiment, message entry area 112 enables a user to enter a message. In one embodiment, messaging application 100 enables a user to type a message into message entry area 112; however, messaging application 100 can enable the user to enter a message through any suitable means such as through voice recognition (e.g., a voice recognition system translates the user's spoken word into text for entry into the text entry area).

In one embodiment, the user enters a portion of a message into message entry area 112 and messaging application 100 determines whether to transmit a segment or a portion (e.g., part of a message that is not yet complete) of the partially entered message to at least one connected friend (e.g., a messaging application participating in a chat session). In one embodiment, the transmitted segment of the partially entered message may include additions or deletions to the partially entered message; however edits to the partially entered message may include any suitable changes to the partially entered message (e.g., highlighted text, deleting entire blocks of text, or modifying text colors or styles).

In one embodiment, messaging application 100 determines whether to transmit a segment of the partially entered message based on a predetermined amount of time that has passed after a predetermined event (e.g., after the user started to enter a message into message entry area 112). In one example, messaging application 100 begins a three second countdown timer after the user starts to enter a message into message entry area 112. After the three seconds have elapsed, messaging application 100 transmits the segment of the partially entered message to at least one connected messaging application; however, it should be appreciated that any suitable amount of time can be used to determine how often to transmit segments of a partially entered message. In one embodiment, messaging application 100 can determine whether to transmit a segment of a partially entered message upon the occurrence of any suitable predetermined event.

Figure 10:
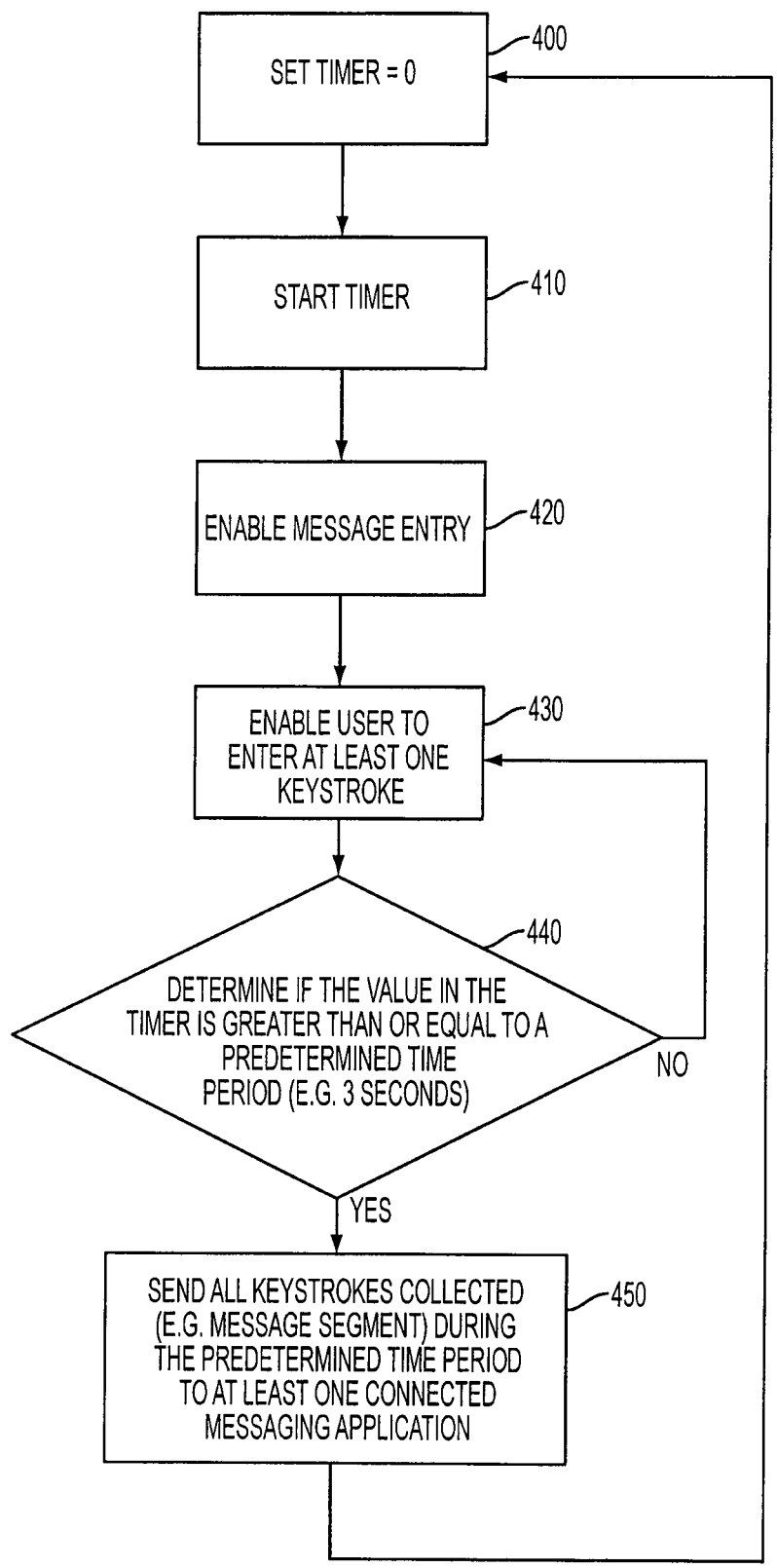
FIG. 10 is a block diagram that illustrates how a messaging application transmits message segments based upon a predetermined time period in accordance with one embodiment.

A timed process for determining when messaging application 100 transmits a message segment is illustrated in FIG. 10. At step 400 a timer is set equal to zero. The timer records the amount of time that elapses between message segment transmissions. At step 410, messaging application starts the timer. At step 420, messaging application 100 enables the user to enter a message. At step 430, messaging application 100 enables the user to enter at least one keystroke. In this embodiment, as opposed to the previous processes, messaging application 100 does not need to track the number of keystrokes because the keystrokes in the transmitted message segments are based on the amount of time that have elapsed since the timer was started; however messaging application 100 may still track the number of keystrokes for other processes. At step 440, messaging application 100 compares the elapsed time recorded in the timer to a predetermined time period. As discussed above, the predetermined time period can be set to any suitable time. If the elapsed time in the timer is less than the predetermined time period, then the process returns to step 430 and messaging application 100 enables the user to enter at least one additional keystroke. However, it should be appreciated that the user may not enter an additional keystroke in the allotted time period. Thus, step 440 may be revisited without the user having entered any additional keystrokes. If the elapsed time in the timer is greater than or equal to the predetermined time period, then the process proceeds to step 450. At step 450, messaging application 100 transmits the keystrokes collected during the predetermined time period as a message segment to at least one connected messaging application. The process returns to step 400 and messaging application 100 sets the timer back to zero.

In an alternative embodiment, messaging application 100 transmits a segment of the partially entered message to at least one connected messaging application after each keystroke. Thus, each time a user enters a character or symbol into message entry area 112, the character or symbol is immediately forwarded to the at least one other messaging application.

Figure 11:
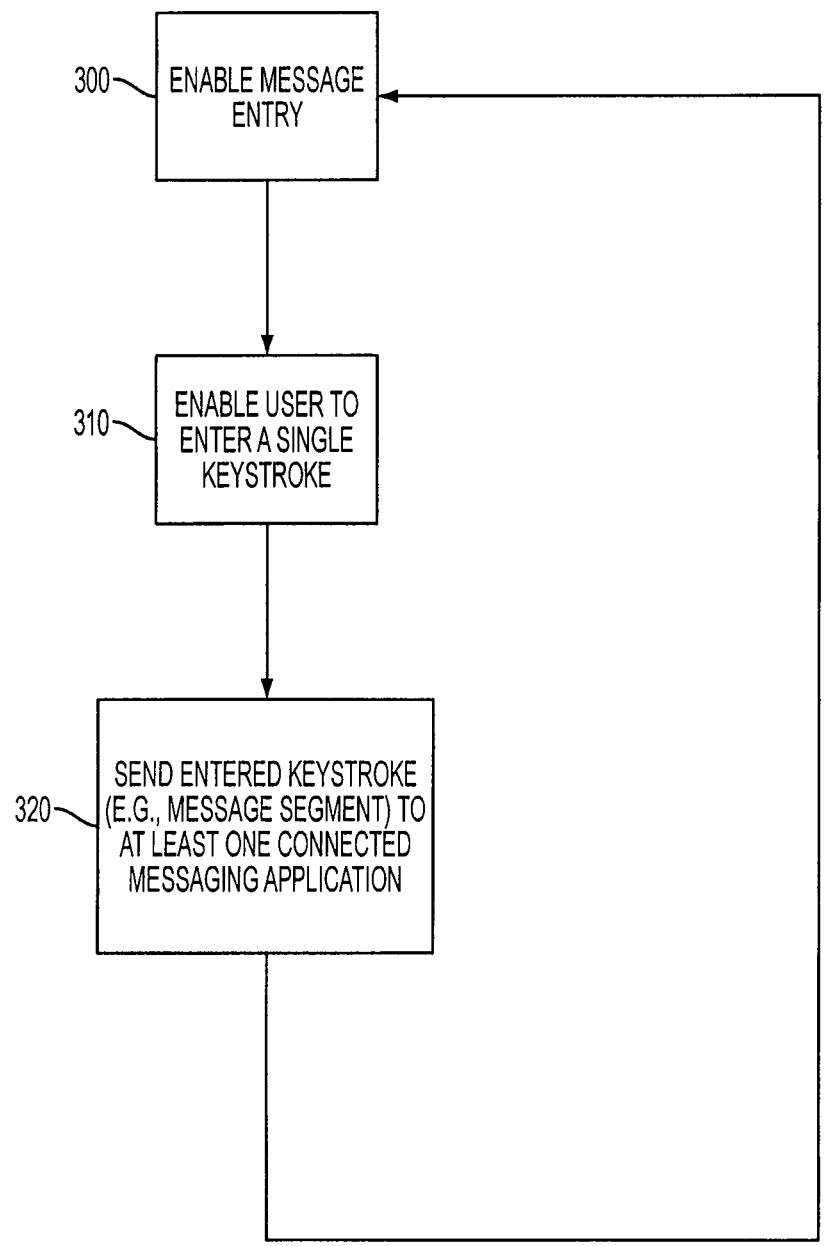
FIG. 11 is a block diagram that illustrates a messaging application that transmits message segments based upon each entered keystroke in accordance with one embodiment.

FIG. 11 illustrates this alternative process for determining when messaging application 100 transmits a message segment. At step 300, messaging application 100 enables the user to enter a message. At step 310, messaging application 100 enables the user to enter a single keystroke. As discussed above, a single keystroke can include adding a character to a message. Alternatively, a single keystroke can also include altering the format of a single character in a message or deleting a single character in a message. In one embodiment, any suitable recognized keystroke can be considered a single keystroke. At step 320, after a single keystroke is entered, messaging application 100 transmits the single collected keystroke as a message segment to at least one connected messaging application. The process returns to step 310 and messaging application 100 enables the user to enter another keystroke.

In one embodiment, messaging application 100 determines whether to transmit a segment of the partially entered message based on the number of keystrokes the user makes to enter the message into message entry area 112. For example, message application 100 transmits a segment of the partially entered message to at least one connected messaging application participating in a chat session after 5 keystrokes (e.g., typing five new characters, or typing two characters+deleting one character+ italicizing two characters). Thus, the at least one other messaging application receives a segment of the partially entered message before the user deems the message to be completed. Alternatively, in one embodiment, any suitable number of keystrokes can be used to determine when messaging application 100 transmits a segment of the entered message to at least one other messaging application.

Figure 12:
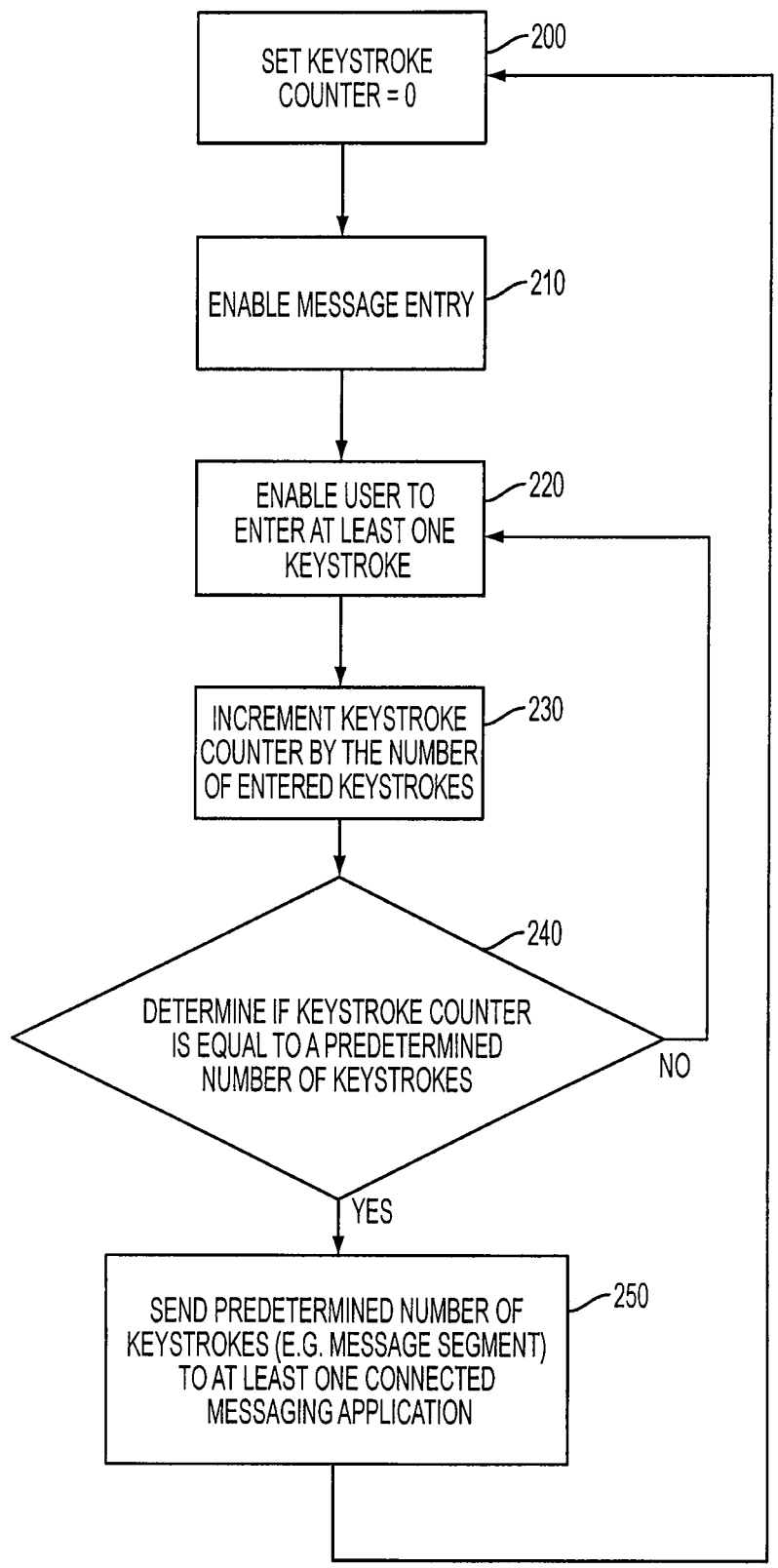
FIG. 12 is a block diagram that illustrates how a messaging application determines when to transmit message segments based upon the number of entered keystrokes in accordance with one embodiment.

One process for determining when messaging application 100 transmits a message segment is illustrated in FIG. 12; however messaging application 100 can determine when to transmit a message segment in any suitable manner. At step 200, a keystroke counter is set equal to zero. The keystroke counter tracks the number of keystrokes a user enters. At step 210, messaging application 100 enables the user to enter a message. At step 220, messaging application 100 enables the user to enter at least one keystroke. After at least one keystroke is entered, a keystroke counter is incremented by the number of entered keystrokes at step 230. At step 240, messaging application 100 compares the value in the keystroke counter to a predetermined number of keystrokes. As discussed above, the predetermined number of keystrokes can be set to any suitable number. If the number in the keystroke counter is less than the predetermined number of keystrokes, then the process returns to step 220 and messaging application 100 enables the user to enter another keystroke. If the number in the keystroke counter is equal to the predetermined number of keystrokes, then the process proceeds to step 250. At step 250, messaging application 100 transmits the collected predetermined number of keystrokes as a message segment to at least one connected messaging application. The process returns to step 200 and messaging application 100 sets the keystroke counter back to zero.

In an another alternative embodiment, messaging application 100 transmits a segment of the partially entered message to at least one connected messaging application based upon the amount of data the user has entered. When the user makes an entry into message entry area 112, messaging application 100 collects the entered information into at least one buffer. The user's entries may include adding new characters to a message, deleting characters, modifying some aspect of the characters (e.g., underlining one or more entered characters, changing the font or colors on one of the characters, etc.). Once the buffer has reached a predetermined size (e.g., 256 bytes, 1 megabyte, or any suitable buffer size) messaging application 100 transmits the buffer as a segment of the entered message to at least one other messaging application.

Figure 13:
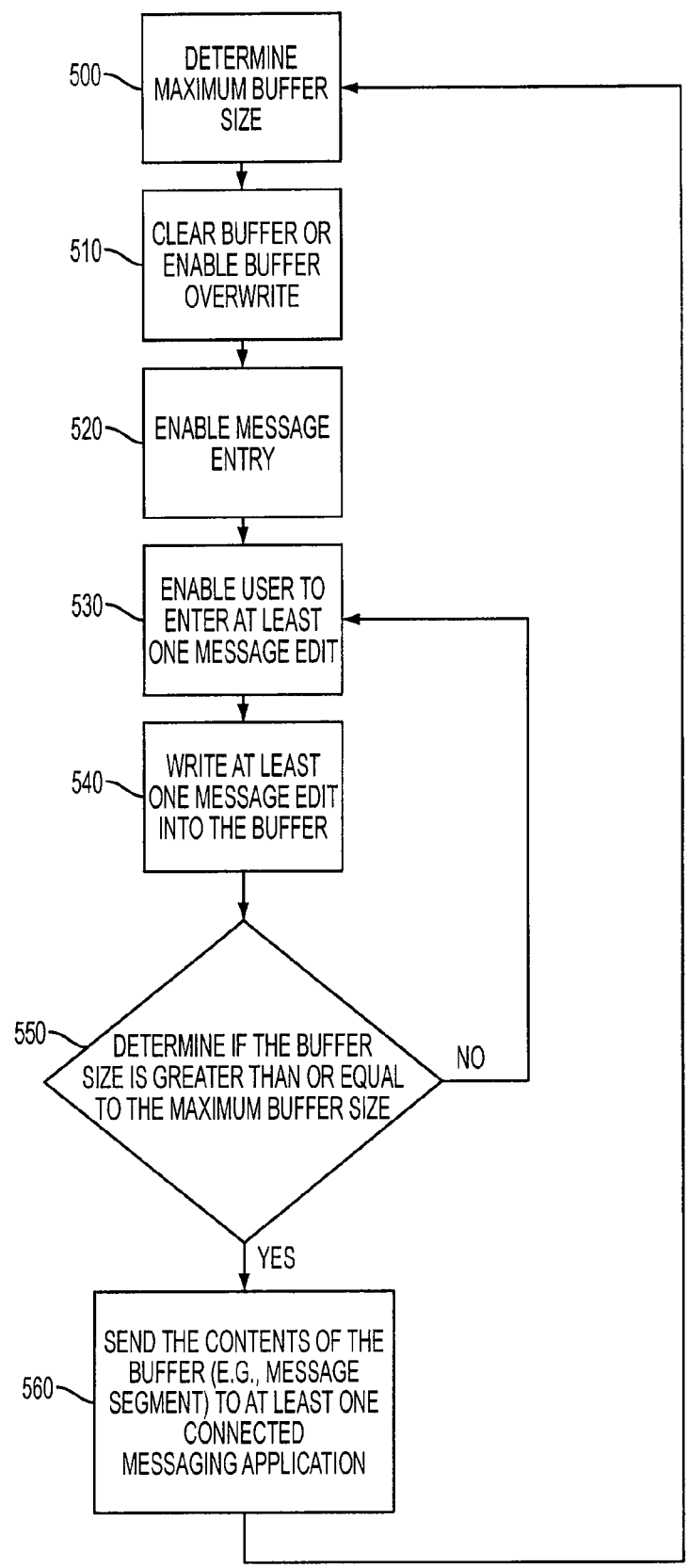
FIG. 13 is a block diagram that illustrates how a messaging application transmits message segments based upon a predetermined amount of data collected in a buffer in accordance with one embodiment.

FIG. 13 illustrates one process for determining when messaging application 100 transmits a message segment, based upon the amount of data the user has entered. At step 500, a maximum buffer size is determined. At step 510, at least one buffer is cleared or enabled to be overwritten. The buffer stores any message edits the user enters into message entry area 112. At step 520, messaging application 100 enables the user to enter a message. At step 530, messaging application 100 enables the user to enter at least one message edit. After one message edit is entered, messaging application 100 writes the message edit into the buffer at step 540. At step 550, messaging application 100 compares the size of the buffer to a predetermined maximum buffer size; however it should be appreciated, that messaging application 100 can check the size of the buffer at any suitable time (e.g., after any suitable number of message edits, to reduce the processing load). As discussed above, the maximum buffer size can be set to any suitable size. If the buffer size is less than the maximum buffer size, then the process returns to step 520 and messaging application 100 enables the user to enter at least one additional message edit. If the buffer size is greater than or equal to the maximum buffer size, then the process proceeds to step 560. At step 560, messaging application 100 transmits the message edits collected in the buffer as a message segment to at least one connected messaging application. The process returns to step 510.

In one embodiment, if messaging application 100 determines that the buffer size is greater than the maximum buffer size, messaging application 100 can still transmit the all of the collected message edits even though the buffer size is greater than the maximum buffer size (e.g., the actual buffer size is larger than the threshold imposed by the maximum buffer size). In another embodiment, if messaging application 100 determines that the buffer size is greater than the maximum buffer size, messaging application 100 can transmit the message edits that equal the maximum buffer size and retain the unsent message edits in an overflow buffer. The process returns to step 510. After the buffer is cleared, messaging application 100 copies the retained unsent message edits from the overflow buffer back to the buffer (e.g., after step 510) and the process continues thereafter as illustrated in FIG. 13.

In one embodiment, each time a segment of partially entered message is transmitted, the segment includes the entire partially entered message. For example, after message application 100 transmits a first segment of a partially entered message that included one word, messaging application 100 determines that a second segment of the same partially entered message is ready to be transmitted. Instead of analyzing the partially entered message for additions or deletions, messaging application 100 transmits the entire partially entered message to at least one connected messaging application (e.g., message segments already transmitted plus any additions or deletions). In an alternative embodiment, messaging application 100 tracks what portions of the partially entered message have previously been transmitted, and only transmits additions or deletions to the partially entered message. For example, if the user entered a first word at the time the first segment of the partially entered message is transmitted, messaging application 100 will not retransmit the first word in the second segment. In other words, at the time messaging application 100 determines that a second segment is to be transmitted, and one word has been entered in addition to the previous word, only the new word would be transmitted. Thus, in this embodiment, messaging application 100 can minimize the amount of data transmitted.

In one alternative embodiment, messaging application 100 transmits status updates to any connected friends during periods where messaging application 100 does not transmit message segments. Thus, even if messaging application 100 does not transmit message segments, connected friends will continue to receive status information regarding what tasks the user at messaging application 100 is performing. In one embodiment, status updates are not limited to what tasks the user at messaging application 100 is performing and can include any task. In one embodiment, the messaging application 100 enables the user to enter user defined status information (e.g., the user is on the phone or the user is getting coffee).

In one embodiment, the user provides a signal to messaging application 100 that the entered message is complete and ready to transmit. In one embodiment, the user selects a predefined key on a keyboard, such as an enter key or return key; however, any suitable key can be designated to signal to messaging application 100 that the message is ready to transmit. In an alternative embodiment, the user can signal to messaging application 100 that the entered message is ready to be transmitted by moving pointer 114 over send message button 116 and selecting send message button 116. In another alternative embodiment, messaging application 100 automatically registers an entered message in message entry area 112 as complete after an occurrence of a predetermined event. In one embodiment, the predetermined event is the passage of a predetermined amount of time (e.g., five minutes after the user began entering a message, the message will automatically be transmitted); however any suitable predetermined event can be used to determine when to designated a message as completed.

In one embodiment, after message application 100 receives the message complete signal, messaging application 100 transmits the entire completed message and a message complete signal to at least one connected messaging application participating in the chat session or to each connected messaging application participating in the chat session. In one embodiment, messaging application 100 determines that the entire completed message had already been transmitted in at least one segment as previously described. Thus, in this embodiment, messaging application 100 only transmits a message complete signal, rather than both the entire completed message and a message complete signal. It should also be appreciated that in one embodiment, messaging application 100 can transmit a portion of the completed message (e.g., the previously unsent portions of the entered message, because other portions were already transmitted in previous message segments) along with the message complete signal.

In another embodiment, messaging application 100 enables the user to enter a message in message entry area 112 including data other than text. For example, a user can enter/input image, video, or audio data into message entry area 112. Thus, the message will be transmitted to a connected messaging application participating in the chat session as the originally entered image, video, or audio file.

As illustrated in FIG. 1, the user of messaging application 100 entered a number of words into message entry area 112 to form a partial message.

FIG. 1 illustrates message status indicator 118 included in messaging application 100. In one embodiment, message status indicator 118 informs a user of messaging application 100 of whether at least one user at another messaging application is participating in a chat session. In one embodiment, message status indicator 118 displays at least one unique identifier of a connected friend that is connected to messaging application 100. Displaying the at least one user's unique identifier informs the user of messaging application 100 that the at least one friend is connected to the chat session as well the identification of the person as who is participating in the chat session. In one embodiment, message status indicator 118 also displays what task the at least one connected user is performing based on any received message segments. For example, if the at least one connected user is entering additions to a message, message status indicator 118 displays text that indicates that the connected user is typing at the other messaging application. Similarly, message status indicator 118 can display text indicating that the at least one connected user is deleting part of an entered message. Message status indicator 118 can also display text indicating that the connected friend is not working on any additional entries in the connected messaging application after passage of a predetermined period of time. It should be appreciated in one embodiment, message status indicator 118 can alternatively display any suitable symbol that represents what task the at least one connected user is performing on the connected messaging application.

In one embodiment, message status indicator 118 also displays segments of a partially completed message (i.e., an in process message) received from at least one connected messaging application. In one embodiment, messaging application 100 receives a message segment that includes all of the partially entered message (e.g., everything that has been entered in to a message entry area of the at least one connected messaging application). In this embodiment, messaging application 100 displays the entire partially received message displayed in message status indicator 118. That is, messaging application 100 replaces any previously received segments of the same message for the currently received segment of the partially entered message. Thus, in one embodiment messaging application 100 does not track what portions of the message are changed from any previously received segments of the same partially completed message. In an alternative embodiment, after messaging application 100 receives the latest message segment of the same partially entered message, messaging application 100 compares the existing message segment displayed in message status indicator 118 and updates message status indicator 118 with any determined changes.

In an alternative embodiment messaging application 100 does not receive entire partially entered messages. Rather, messaging application 100 receives segments of a partially entered message that includes updates to any previously received segments of a partially entered message. Thus, in this embodiment, messaging application 100 determines the changes or differences in the partially entered message based on the message segment received and displays the changes in message status indicator 118 (e.g., displaying partial message additions or partial message deletions). In one embodiment, the changes displayed in message status indicator 118 are displayed such that the message appears to be edited as the user is typing; however, messaging application 100 can display updates and additions to message status indicator 118 in any suitable manner with any suitable animation techniques.

Figure 16:
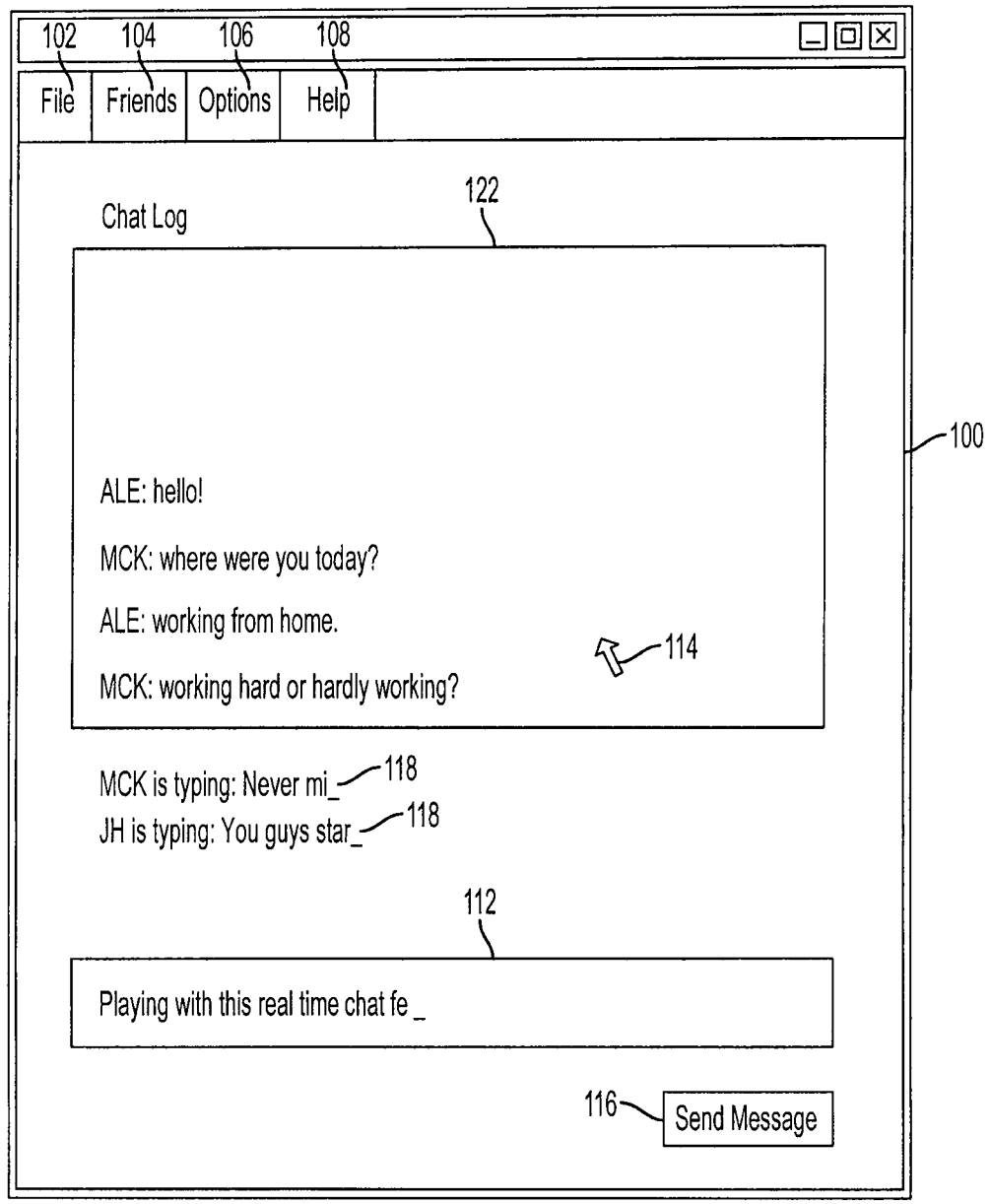
FIG. 16 is an illustration of a messaging application displaying received segments of a plurality of different messages before the messages are completed in accordance with one embodiment.

In one embodiment, messaging application 100 can be connected to more than one messaging application. Thus, in one embodiment, messaging application 100 displays status and message segments received from more than one connected messaging applications. In one embodiment, if messaging application 100 is connected to more than one messaging application, messaging application 100 cycles through the information displayed in message status indicator 118 from the plurality of connected message applications. That is, messaging application 100 changes the information displayed in message status indicator 118 at a predetermined or random interval to keep a user of messaging application 100 informed of what their connected friends are typing. In an alternative embodiment, messaging application 100 displays a message status indicator 118 for each connected friend. In one embodiment, each additional message status indicator 118 is displayed in a single area of messaging application 100. That is, in this embodiment, as illustrated in FIG. 16, all of the displayed message status indicators 118 are grouped together, in the same area of one window of messaging application 100. However, in an alternative embodiment, additional message status indicators 118 for the connected friends are displayed in at least one graphical user interface window separate from message application 100.

As illustrated in FIG. 1, message status indicator 118 displays that a friend connected to messaging application 100 in a chat session is entering part of a message. FIG. 1 further illustrates that messaging application 100 received at least one segment of a partially entered message and displayed the at least one received segment in message status indicator 118.

FIG. 1 illustrates chat log 122 included in messaging application 100. In one embodiment, chat log 122 displays at least one line of a completed message that is received from at least one connected friend. In an alternative embodiment, chat log 122 displays a plurality of completed messages. When message application 100 receives a message or a segment of a message from at least one connected friend, messaging application 100 processes the message or segment of a message to determine whether a message complete signal is included with the received message or segment of a message. In one embodiment, messaging application 100 determines that a message is completed by receipt of a complete message signal in connection with at least one message segment. In one embodiment, a complete message signal follows a complete message, such as a complete sentence. However, a complete message signal may be received in response to the different events described above in connection with generating a complete message signal. Thus, a complete message signal can follow as little as a single letter, symbol, or no letter or no symbol.

In one embodiment, if messaging application 100 determines that a message complete signal is included with a received message or segment of a message, messaging application 100 displays the completed message in chat log 122. In one embodiment, each completed message displayed in chat log 122 is preceded by the author of the completed message (e.g., the author's unique identifier) to identify different participants in the conversation. In one embodiment, if messaging application 100 determines that a message complete signal is included with a received message or segment of a message, messaging application 100 clears or resets message status indicator 118.

In one embodiment, a completed message includes a compilation of any previously received message segments of a partially entered message and any updates to the previously received message segments (i.e., the whole message is transmitted). Thus, in this embodiment, the completed message is based on the previously received message segments. In an alternative embodiment, the completed message is not based on any previously received message segments. Thus, in this embodiment, messaging application 100 receives the completed message in its entirety and displays the completed message in chat log 122, without basing the displayed completed message on any previously received message segments (i.e., as above, the whole message is transmitted).

In one embodiment, chat log 122 displays completed messages starting from the bottom of chat log 122. As additional messages are displayed in chat log 122, the older messages (chronologically) are moved towards the top of chat log 122. Thus, in this embodiment, completed messages appear to scroll towards the top of chat log 122. If more completed messages fill chat log 122 than can be displayed at one time, chat log 122 enables the user to scroll through the entire chat log 122 in any suitable manner. Thus, it should be appreciated, that messaging application 100 at least temporarily stores completed messages in chat log 122. In one embodiment, this storage is limited only by the quantity of memory available on a device running messaging application 100. In one embodiment, at least part of all of the completed messages in chat log 122 can be permanently stored or saved for later viewing. It should be appreciated, that messaging application can store records of one or more chat logs in any suitable manner. In one alternative embodiment, completed messages are initially displayed from the top of chat log 122 and appear to scroll down as new completed messages appear in chat log 122. It should also be appreciated that completed messages can begin at any suitable location in chat log 122 and move in any suitable direction to inform a user of the chronological order of the messages.

Figure 14:
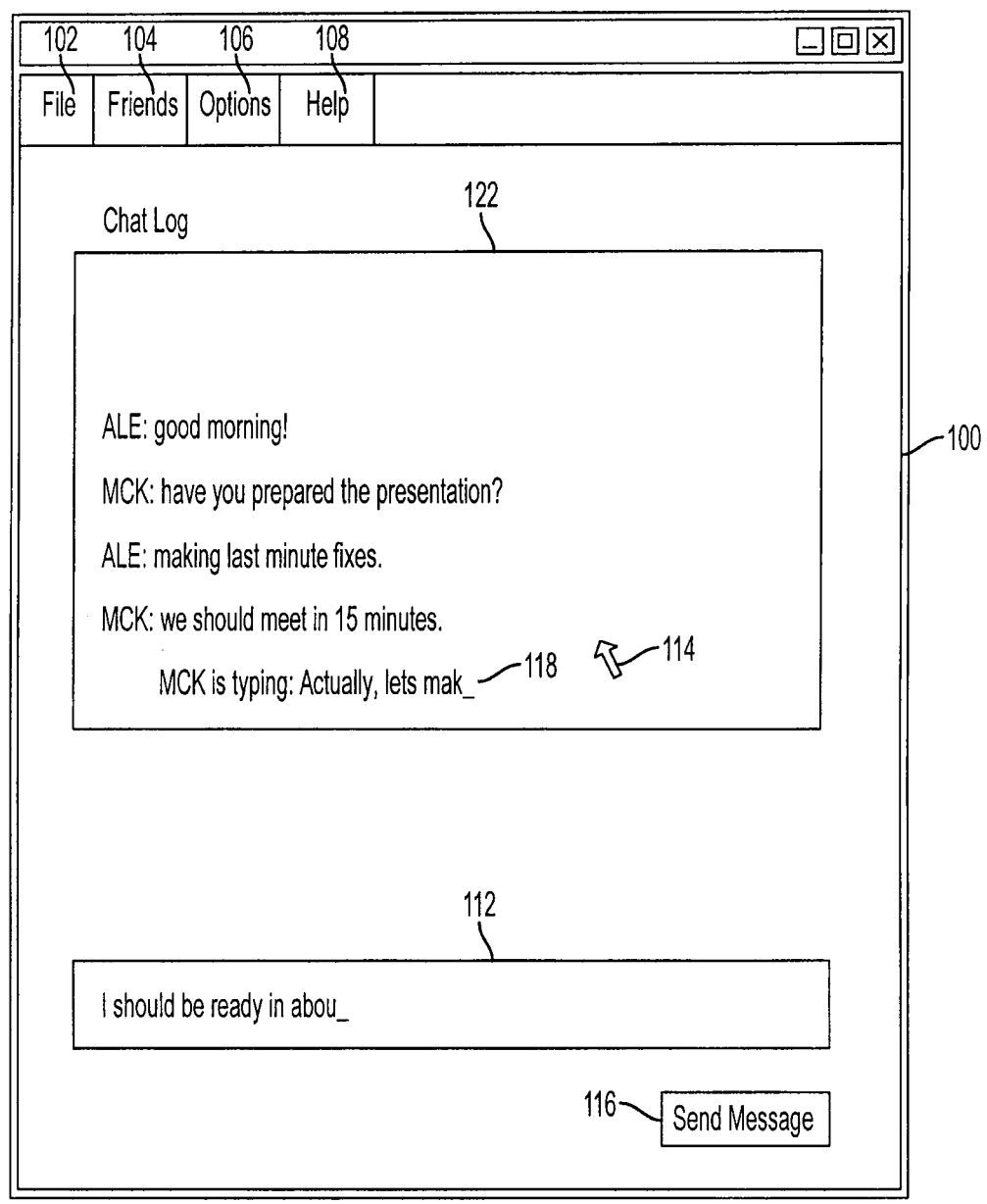
FIG. 14 is an illustration of a messaging application displaying received segments of a message with completed messages in accordance with one embodiment.

In one embodiment, chat log 122 also displays message status indicator 118 and any partially completed message. As illustrated in FIG. 14, in one embodiment, when messaging application 100 receives segments of a partially completed message from a connected messaging application, message status indicator 118 appears in at the bottom of chat log 122 beneath the completed messages. In one embodiment, once a partially completed message has been completed or deleted, message status indicator 118 is removed from chat log 122 until another partially completed message is in process. In one embodiment, message status indicator 118 is indented relative to the completed messages to further distinguish message status indicator 118 from the completed messages. However, when message status indicator 118 appears in chat log 122, message status indicator 118 can be distinguished from completed messages in any suitable manner. In one embodiment including more than one connected messaging applications, if users of each of the connected messaging applications are entering a message, a message status indicator 118 appears in chat log 122 for each partially completed message.

Figure 15:
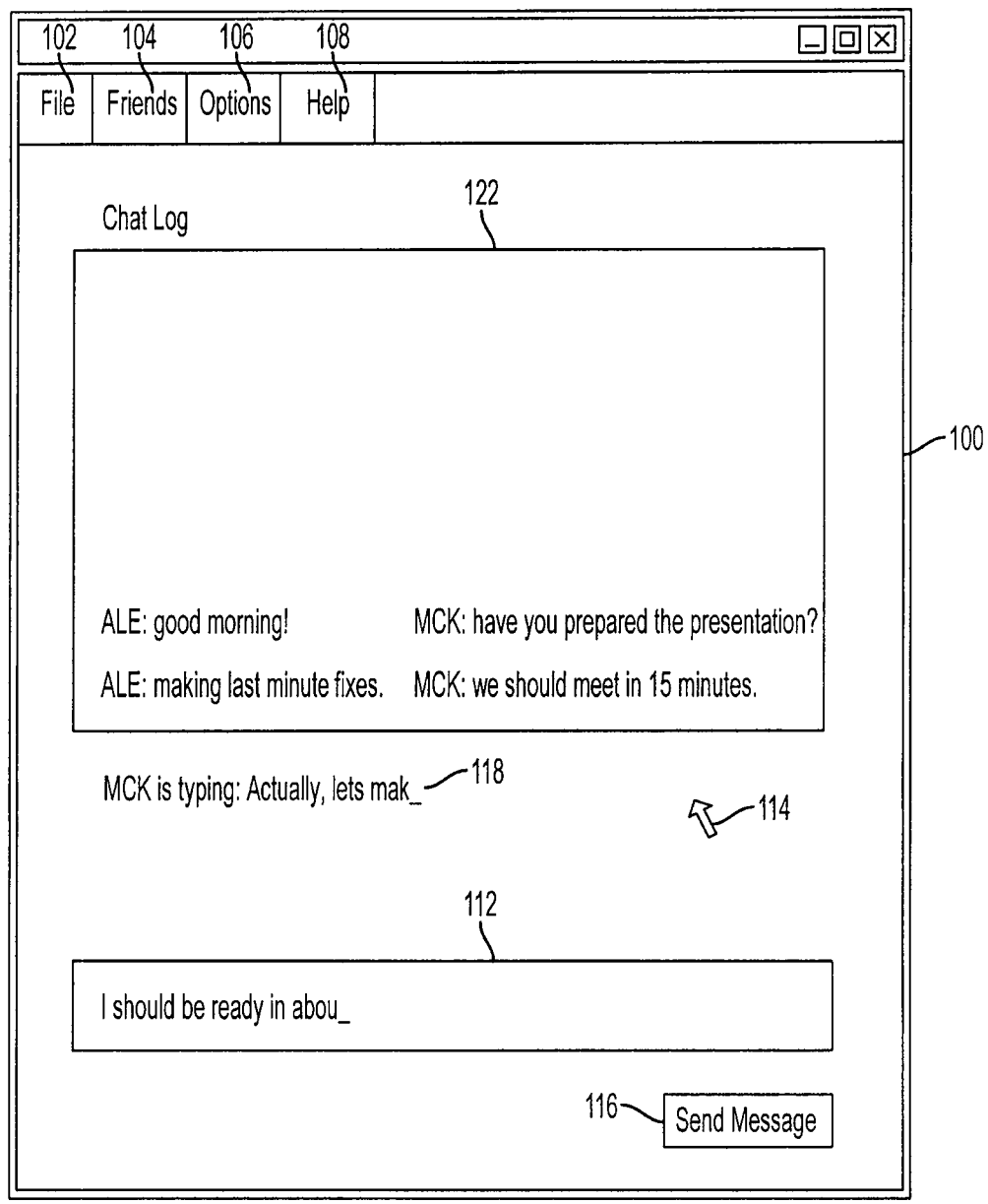
FIG. 15 is an illustration of a messaging application displaying completed messages in accordance with one embodiment.

In one embodiment, chat log 122 also displays completed messages in alternative formats. In one embodiment, as illustrated in FIG. 15, completed messages are displayed in more than one column. In one embodiment including two connected friends, each friend receives their own column in chat log 122. Thus, in this embodiment, as each user completes a message, the completed message for each user is displayed in the column dedicated to the particular user. Thus, in one embodiment, rather than a conversation of completed messages displayed interleaved in a single column, the completed messages are displayed in parallel columns. In one embodiment including a plurality of connected messaging applications, each connected messaging application receives a separate column.

In one embodiment, messaging application 100 enables a user to delete or edit completed messages in chat log 122. In one embodiment, each user connected/participating in a messaging session can delete or edit completed messages in chat log 122. However, in one embodiment, the ability to edit or delete completed messages in chat log 122 is restricted to at least one designated user connected in the messaging session. In one alternative embodiment, before any completed message in chat log 122 can be deleted or edited, each user or a designated number of participating users must agree that at least part or all of a completed message can be deleted or edited. However, it should be appreciated that in one embodiment, no completed messages in chat log 122 can be edited.

Returning now to FIG. 1, chat log 122 displays a conversation between two different users. The conversation includes four completed messages. The author of each message precedes each displayed completed message to enable users of messaging application 100 to distinguish between each user's completed message. In one embodiment, chat log 122 includes space to display additional completed messages. In one embodiment, chat log 122 can be configured to accommodate any suitable number of completed messages.

Figure 2:
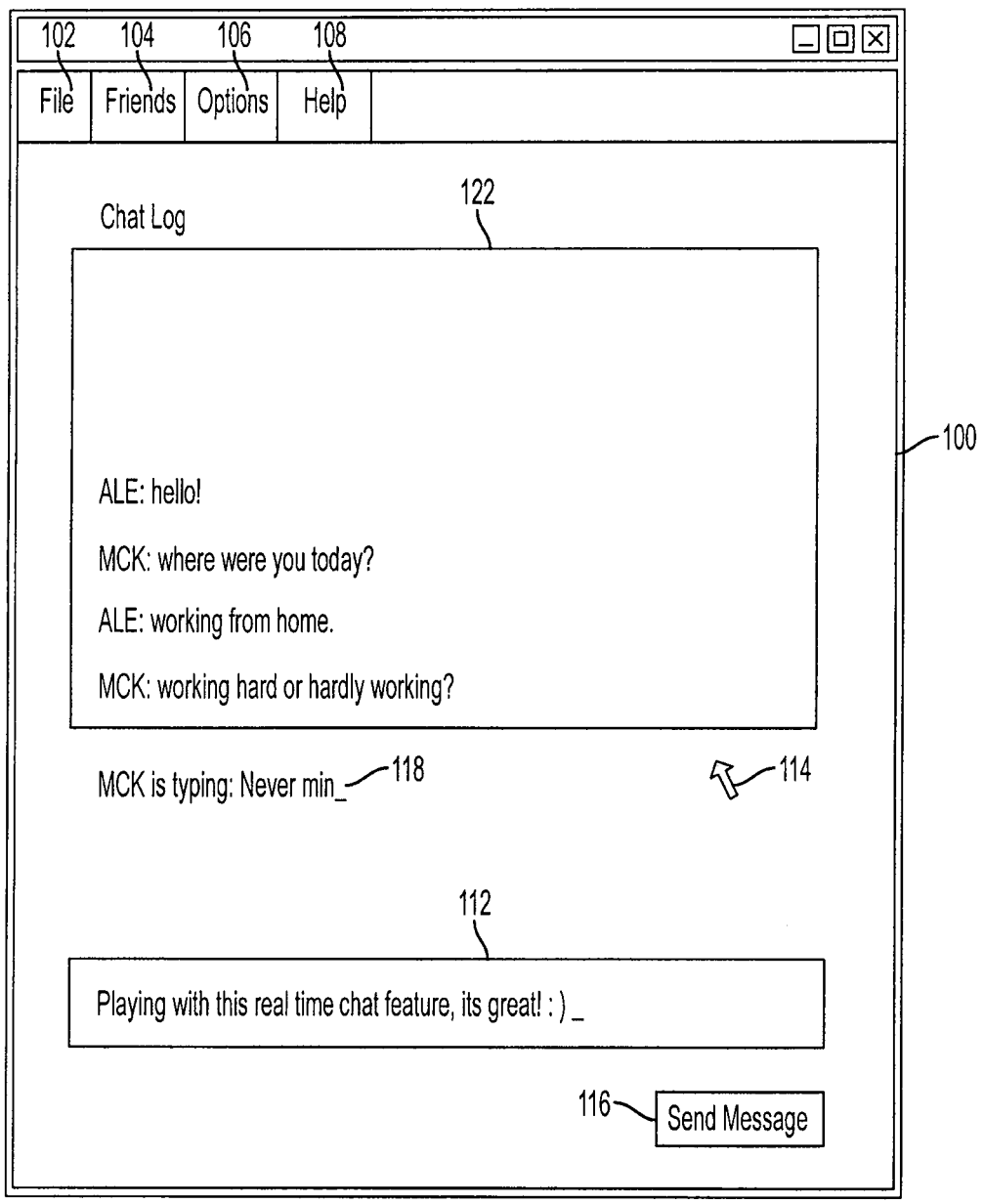
FIG. 2 is an illustration of the messaging application displaying additional received segments of a message in accordance with one embodiment.

As illustrated in FIG. 2, messaging application 100 displays updates to message entry area 112. Message entry area 112 reflects that the user "ALE" of messaging application 100 has entered additional text and appears to have finished a message. Messaging application reflects that user "ALE" is moving pointer 114 towards send message button 116. As discussed above, messaging application may have already transmitted one or more segments of user ALE's message to connected friend MCK using one of the suitable methods for transmitting partially entered messages to connected friends. Messaging application 100 also updated message status indicator 118 to reflect that messaging application 100 received at least one additional message segment from connected friend "MCK". Messaging application 100 also received status updates from connected friend "MCK" that "MCK" is still entering part of a message. Thus, messaging application 100 continues to display in message status indicator 118 that connected friend "MCK" is entering additions to the previously received message.

Figure 3:
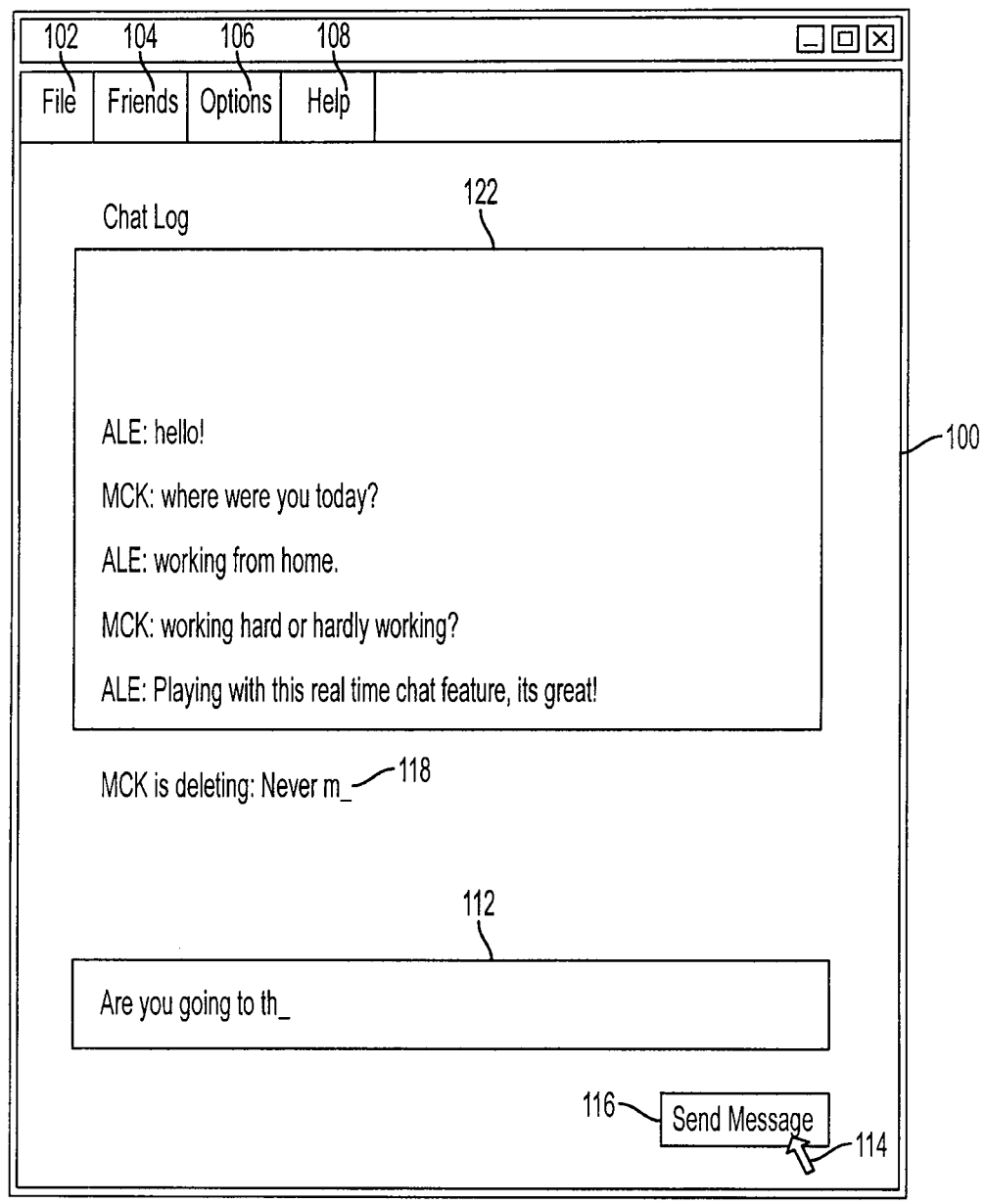
FIG. 3 is an illustration of the messaging application displaying deletions of the previously received segments of a message in accordance with one embodiment.

As illustrated in FIG. 3, user "ALE" completed entering the message in message entry area 112. User "ALE" also moved pointer 114 over send message button 116 and selected send message button 116. As described above, messaging application 100 also could have received the message complete signal based on alternate occurrences of a predetermined event. Once messaging application 100 received a message complete signal as a result of the selected send message button 116, messaging application 100 displayed the completed message (illustrated in message entry area of FIG. 2) in chat log 122 along with the four previously completed messages.

In one embodiment, some predetermined combinations of text symbols are further interpreted by messaging application 100. For example, if messaging application 100 determined that a combination of ":" followed by a ")" is to be displayed in chat log 122, messaging application 100 can replace the combination of characters with at least one other symbol such as a smiley face; it should however be appreciated that any combination of text symbols can be associated with replacement symbols. In the illustrated embodiment, messaging application 100 determined that user "ALE" entered the combination ":)" and converted the ":)" into a smiley face when messaging application 100 displayed the completed message in chat log 122.

As further illustrated in FIG. 3, messaging application 100 also transmitted the completed message and a complete message signal to connected friend "MCK" and cleared message entry area 112 after receiving the message complete signal. Message entry area 112 reflects that message application 100 received an entry of a portion of a new message from user "ALE". Messaging application 100 also received updated message segments from connected friend "MCK". The message segments indicated that connected friend "MCK" was deleting portions of the previously entered and received message segments. Thus, messaging application 100 updated message status indicator 118 to reflect that connected friend "MCK" is deleting part of the previously received message. Messaging application 100 also updated message status indicator 118 to reflect that messaging application 100 has received a message segment reflecting that connected friend "MCK" deleted two letters from the previously received message segments.

Figure 4:
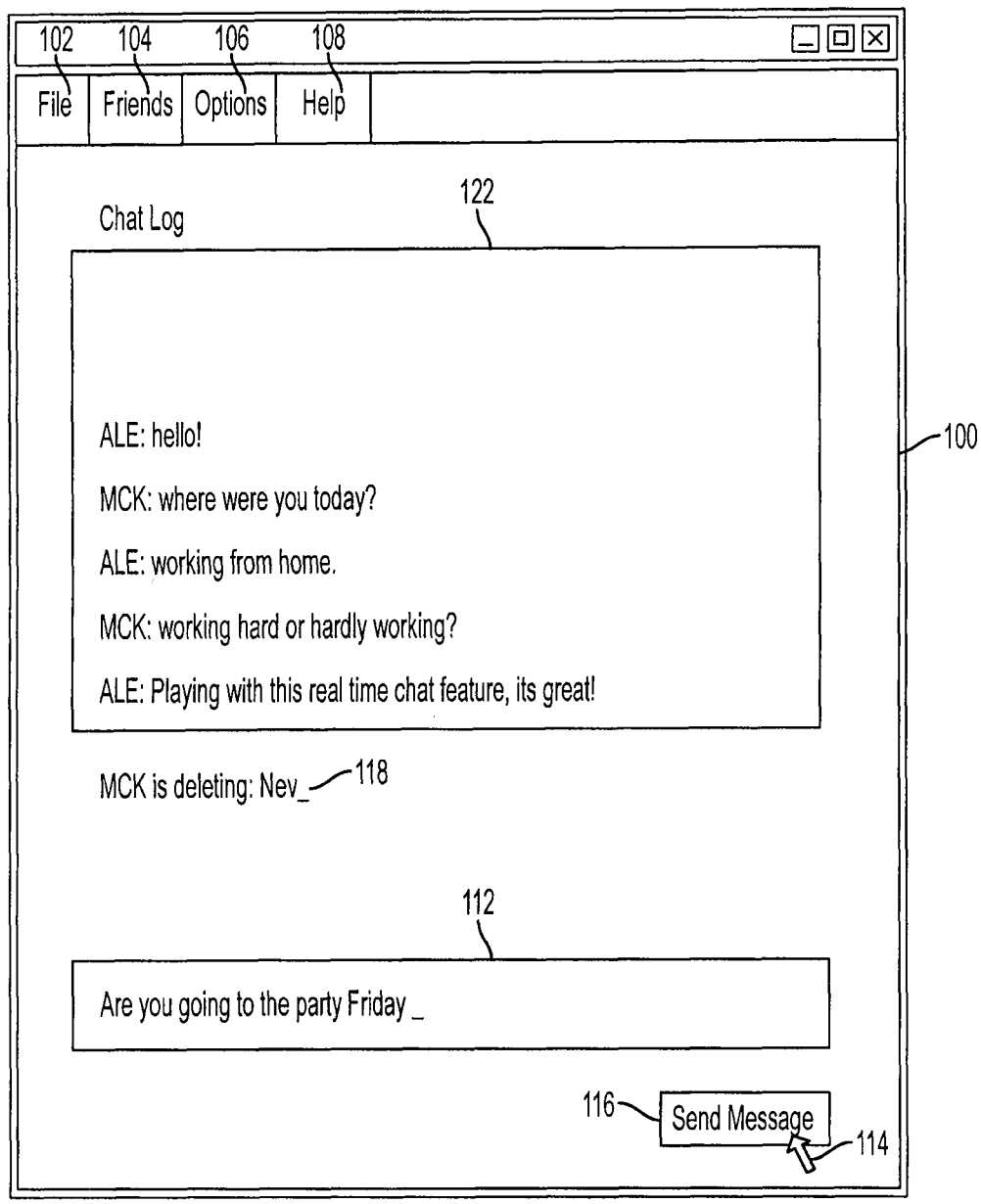
FIG. 4 is an illustration of the messaging application displaying additional deletions of the previously received segments of a message in accordance with one embodiment.

As illustrated in FIG. 4, messaging application 100 received further updates from user "ALE" and connected friend "MCK". Messaging application 100 updated message entry area 112 to reflect that messaging application 100 received additional message entries from user "ALE". Messaging application 100 also received updated message segments from connected friend "MCK". The message segments indicated that connected friend "MCK" continued to delete portions of the previously entered and received message segments. Thus, messaging application 100 continued to display in message status indicator 118 that connected friend "MCK" is deleting part of the previously received message. Messaging application 100 also updated message status indicator 118 to reflect that messaging application 100 received a message segment reflecting that connected friend "MCK" deleted three additional letters from the previously received message segments.

Figure 5:
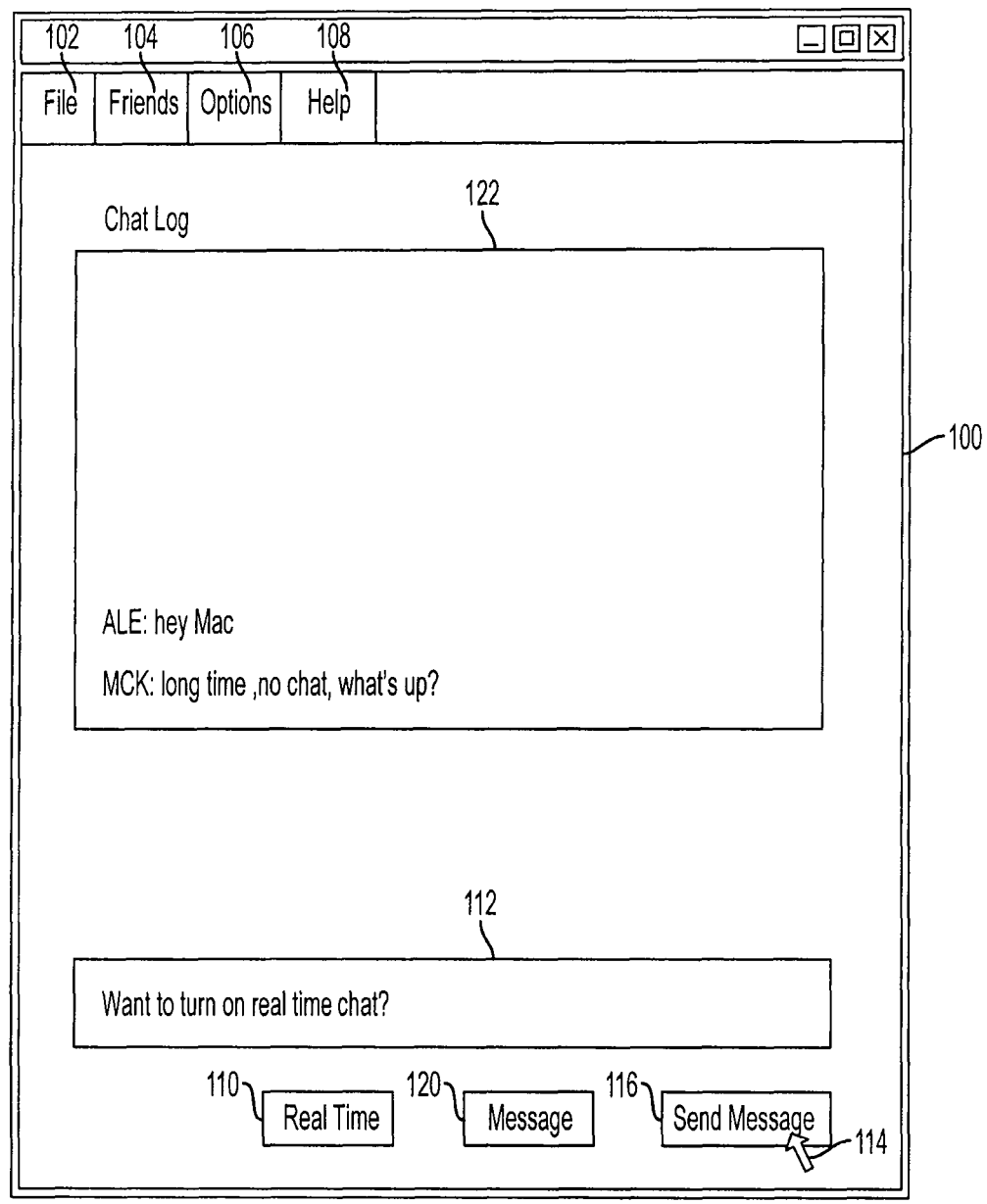
FIG. 5 is an illustration of a messaging application that shows received, completed messages in accordance with one embodiment.

Referring to FIG. 5, one embodiment of messaging application 100 is illustrated without message status indicator 118 activated or visible. In this example, user "ALE" and connected friend "MCK" are engaged in a chat message session. As illustrated in chat log 122, messaging application 100 received a completed message from user "ALE" and connected friend "MCK". Messaging application 100 reflects that user "ALE" has entered a complete message into message entry area 112. Messaging application 100 also reflects that user "ALE" moved pointer 114 over send message button 116 and selected send message button 116. In one embodiment, if message status indicator 118 is not activated, messaging application 100 does not transmit or receive message segments of the partially entered messaged. Thus, in one embodiment, while the features are inactive, messaging application 100 does not transmit and receive complete messages.

Figure 6:
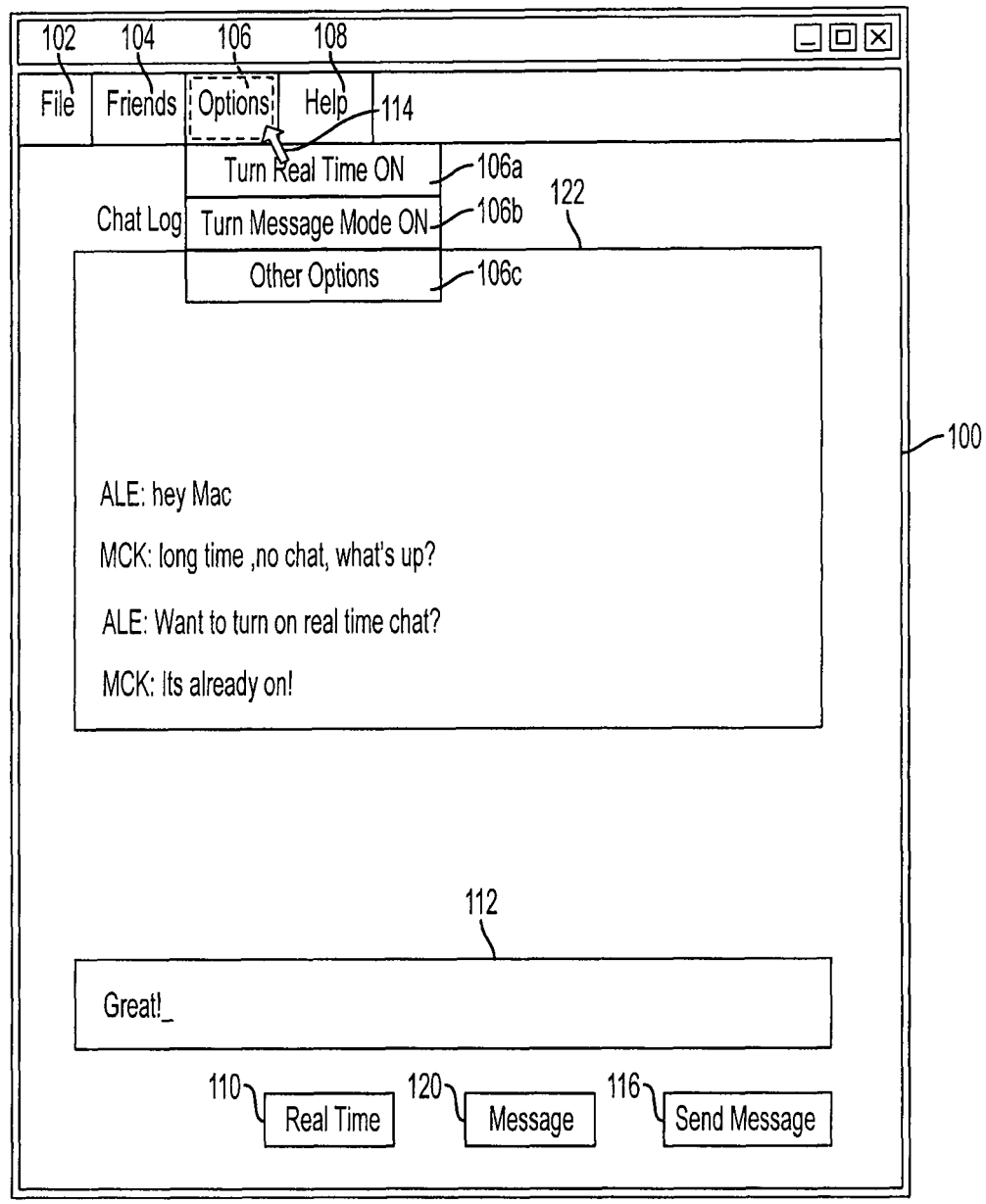
FIG. 6 is an illustration of the messaging application that includes options to receive and view segments of a message from another messaging application before a message is completed in accordance with one embodiment.

As illustrated in FIG. 6, messaging application 100 received a completed message from user "ALE" and connected friend "MCK" as reflected in chat log 122. User "ALE" and "MCK" agreed to activate message status indicator 118. In one embodiment, one user can have the message status indicator 118 active while connected to a user without the features activated. Thus, as in this example, connected friend "MCK" already had message status indicator 118. It should be also be appreciated that in one embodiment, messaging application 100 can be configured to have message status indicator 118 active, but not visible. Thus, in one embodiment, messaging application 100 can transmit and receive message segments in the background.

As further illustrated in FIG. 6, user "ALE" moved pointer 114 to the options menu button 106 and selected options menu button 106 to activate message status indicator 118. In the illustrated embodiment, selecting menu button 106 causes a drop down menu to appear with a plurality of selections 106a-106c, such as described above. In the illustrated embodiment, the drop down menu displays the options to activate or deactivate the message status indicator 118. However, it should be appreciated that message status indicator 118 can be activated or deactivated in any suitable manner. In one alternative embodiment, message status indicator 118 can alternatively be activated or deactivated by selecting button 110 or 120 respectively. In one embodiment, message status indicator 118 can be activated or deactivated by either selections from menu button 106 or using buttons 110 or 120. It should also be appreciated that in one embodiment, chat log 122 can be activated or deactivated in a similar manner as message status indicator 118. Thus, in one embodiment, chat log 122 is hidden from a user of messaging application 100.

Figure 7:
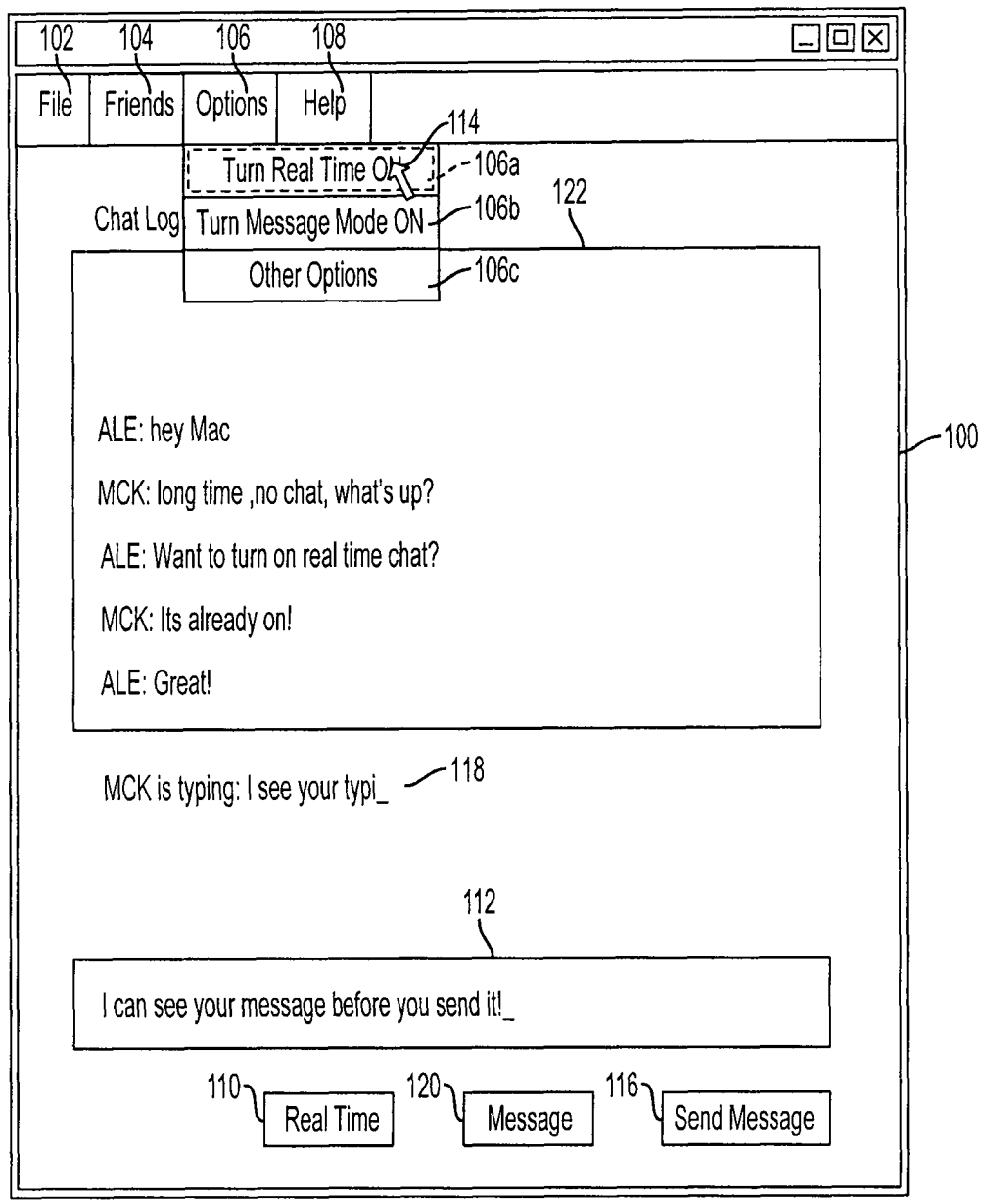
FIG. 7 is an illustration of the messaging application that includes displaying message segments before a message is completed in accordance with one embodiment.

As illustrated in FIG. 7, user "ALE" moved pointer 114 over and selected "turn message segment chat on" menu button 106b. After messaging application 100 receives the signal to activate or make message status indicator 118 visible, messaging application 100 displays message status indicator 118. Messaging application 100 thereafter transmits and receives message segments of partially completed messages. Thus, messaging application 100 updates message status indicator 118 to display that connected friend "MCK" is entering a message. Messaging application 100 also receives at least one message segment from connected friend "MCK" and displays the at least one received message segment in message status indicator 118. Messaging application 100 also displays that user "ALE" has entered an additional message into message entry area 112. In one embodiment, messaging application 100 also transmits at least one segment of the partially completed message in message entry area 112.

Figure 8:
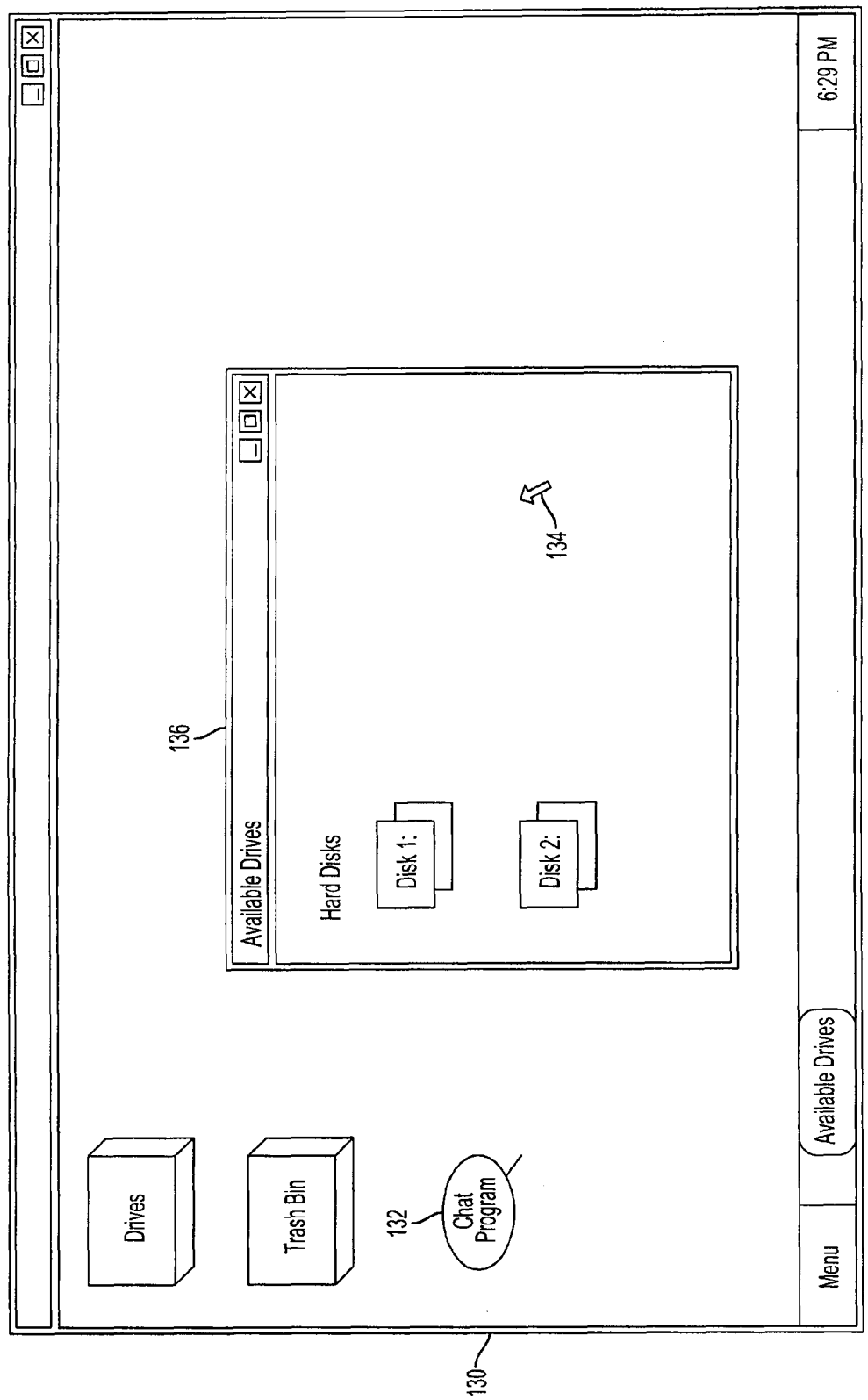
FIG. 8 is an illustration of a graphical user interface that enables a user to activate a messaging application in accordance with one embodiment.
Figure 9:
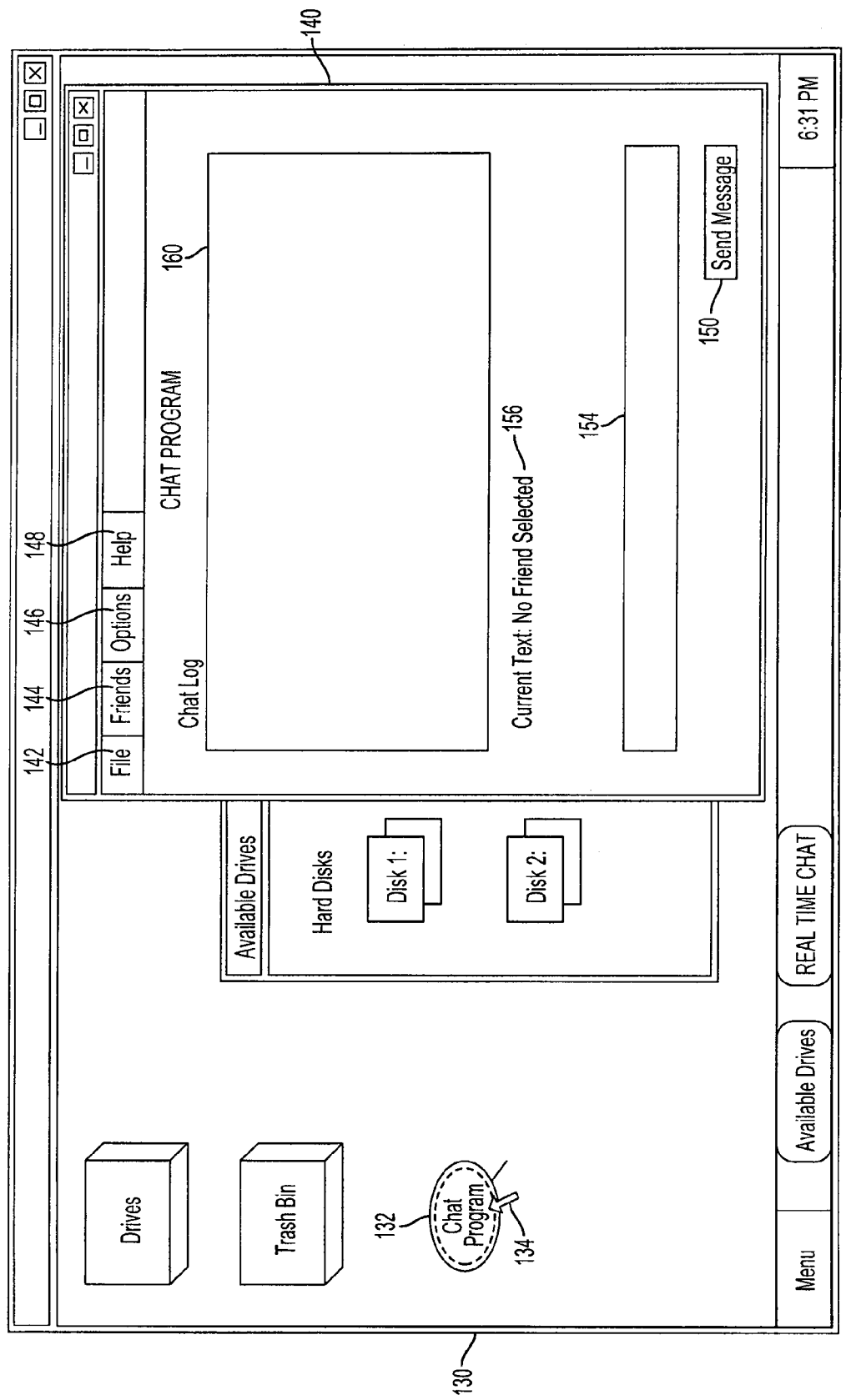
FIG. 9 is an illustration of an activated messaging application that automatically includes a display area for displaying message segments before the message is completed in accordance with one embodiment.

Referring now to FIGS. 8 and 9, one embodiment of a messaging application is illustrated running in a graphical user interface operating system environment 130. In one embodiment, messaging application 100 is implemented in a personal computer terminal running an operating system such as LINUX™. However, it should be appreciated that the messaging application can be implemented and run within any suitable operating system. Likewise, the messaging application is not limited to operating in a personal computer terminal. In one embodiment, messaging application can be run in any sort of terminal, such as a mobile phone, thin-client terminal, or any other suitable computing terminal. As illustrated in FIG. 8, operating system environment 130 includes typical application objects such as a link 132 to activate message application program, pointer 134, and file menu browser 136. In one embodiment, operating system 130 enables a user to move pointer 134 over link 132 to select link 132. Selecting link 132 activates or opens the messaging application. In an alternative embodiment, the messaging application can be opened or activated in any suitable manner.

As illustrated in FIG. 9, the user selected link 132 with pointer 134 and activated messaging application 140. Messaging application 140 automatically started with a plurality of menu buttons 142, 144, 146, 148, and send message button 150. Messaging application 140 also started with default user's unique identifier "ALE" based on a previously entered unique identifier. User "ALE" did not enter any message, thus message entry area 154 remains clear. In this embodiment, messaging application 140 also automatically started with message status indicator 156 activated. However, as discussed in FIGS. 5-7, messaging application 140 can start without message status indicator 156 activated. Thus, a user may be required to activate message status indicator 156 to use these features. In this embodiment, user "ALE" has not yet selected a friend to connect to, thus message status indicator 156 displays that no friend is selected and does not display any messages. In one embodiment, messaging application 140 enables a user to select a friend to connect to using the friend menu button 144, as discussed above; however it should be appreciated that the user can select a friend to connect to using any suitable method. Furthermore, in this embodiment, chat log 160 remains clear because messaging application 140 does not have any completed messages to display.

In one embodiment, the messaging application connects with emergency services (e.g., police or fire and rescue services). In one embodiment, the messaging application connects with emergency services using existing 911 networks (e.g., translating text to voice) or existing 911/TDD/TTY compatible devices to transmit messages and message segments of partially entered messages. In another alternative embodiment, the messaging application connects to emergency services operating a messaging application; however, it should be appreciated that the messaging application can connect to emergency services using any suitable method. In these embodiments, transmitted message segments of a partially entered message enables a user to communicate with emergency services without requiring the user to complete a message or to signal that a message is complete. In one embodiment, a user may connect with emergency services to request assistance. Due to unavoidable circumstances, a user may be unable to enter a complete message requesting help. Thus, in this embodiment, after a portion of a message is entered into message entry area, at least one message segment can be transmitted to emergency services automatically as described above. In some embodiments as described above, transmitted or received message segments may include deletions to previously transmitted or received message segments. However, in one embodiment where the messaging application connects to emergency services, any received deletions are not removed from the display of a message segment display. In one embodiment, instead of displaying deletions, messaging application indicates that deletions requests were received and continues to display any message segment previously received and displayed in a message segment display area.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for messaging based communication comprising:
   enabling a first message to be entered into a message entry area of a first messaging application;
   receiving at least one segment of a second message from at least one remote messaging application before the second message is completed, wherein the remote messaging application sends the at least one segment of the second message based on a timer by:
      monitoring an amount of time that elapses between message segment transmissions;
      enabling a user to enter at least one keystroke;
      comparing the elapsed time to a predetermined amount of time;
      if the elapsed time is less than the predetermined amount of time, enabling the user to enter at least one additional keystroke; and
      if the elapsed time is greater than or equal to the predetermined amount of time, transmitting the keystrokes collected during the predetermined time period as the second message segment to at least one connected messaging application;
   displaying the received segment of the at least one second message in an in process message display area of the first messaging application;
   receiving the second message completely from the at least one remote messaging application; and
   displaying the completed message in a designated completed message display area of the first messaging application.

2. The method of claim 1, further including receiving a second segment of the second message.

3. The method of claim 2, further including receiving a deletion or correction of all or part of the previously received segment of the second message.

4. The method of claim 1, wherein the at least one message segment and the at least one completed message are routed through a server.

5. The method of claim 1, wherein the at least one message segment and the at least one completed message are transmitted and received through a peer-to-peer connection.

6. The method of claim 1, wherein one of the following occurs:
   (1) if the at least one message segment is transmitted through a peer-to-peer connection, then the at least one completed message is routed through a server; and
   (2) if the at least one completed message is transmitted though a peer-to-peer connection, then the at least one message segment is routed through a server.

7. The method of claim 1, wherein the first messaging application is a text messaging application.

8. The method of claim 1, wherein the messages include files selected from the group comprising of: text, audio, video, or image files.

9. The method of claim 1, which includes enabling the partial message display area to be disabled.

10. The method of claim 1, which includes enabling at least one segment of the first message to be transmitted to at least one remote messaging application as the first message is entered into the message entry area of the first messaging application.

11. The method of claim 1, which includes enabling activation of a message complete signal in the first messaging application.

12. The method of claim 11, which includes after the message complete signal is activated, enabling each message segment of the first message to be combined into a completed message.

13. The method of claim 12, further including displaying the completed message in the completed message display area.

14. The method of claim 12, which includes after the message complete signal is activated, enabling the completed message to be removed from the message entry area after the completed message is displayed in the completed message display area.

15. The method of claim 1, wherein the first messaging application transmits a message complete signal after transmitting a final segment of a message.

16. The method of claim 1, further including:
   enabling at least one segment of the first message to be transmitted to the at least one remote messaging application before the message is completed;
   receiving at least one segment of a first message from the first messaging application;
   displaying the received segment of the first message in an in process message display area of the at least one remote messaging application; and
   receiving at least one completed message from the first messaging application;
   displaying the completed message in a designated completed display area of the second messaging application.

17. The method of claim 16, wherein transmitting the segment of the first message includes automatically transmitting the message while the message is being entered.

18. The method of claim 16, wherein transmitting the segment of the first message includes periodically transmitting a segment of the first message.

19. The method of claim 16, wherein transmitting the segment of the first message includes transmitting the segment of the message after a predetermined number of keystrokes.

20. A computer program product comprising:
   a non-transitory computer readable medium having computer readable program code embodied therein configured to operate a messaging system, said computer program product comprising:
   computer readable code configured to cause a computer to enable at least one message to be entered into a message entry area of a first messaging application;
   computer readable code configured to cause a computer to receive at least one segment of a second message from a second messaging application before the second message is completed, wherein the remote messaging application sends the at least one segment of the second message based on a timer by:
      monitoring an amount of time that elapses between message segment transmissions;
      enabling a user to enter at least one keystroke;
      comparing the elapsed time to a predetermined amount of time;
      if the elapsed time is less than the predetermined amount of time, enabling the user to enter at least one additional keystroke; and
      if the elapsed time is greater than or equal to the predetermined amount of time, transmitting the keystrokes collected during the predetermined time period as the second message segment to at least one connected messaging application;

computer readable code configured to cause a computer to display the received portion of the at least one second message in an in process message display area of the first messaging application;

computer readable code configured to cause a computer to receive the second message completely from the second messaging application; and computer readable code configured to cause a computer to display the completed message in a designated completed display area of the first messaging application.

* * * * *